(12) United States Patent
Zhu et al.

(10) Patent No.: US 12,216,011 B2
(45) Date of Patent: Feb. 4, 2025

(54) SYSTEMS AND METHODS FOR IMPROVED SENSING PERFORMANCE OF PRESSURE-SENSITIVE CONDUCTIVE SHEETS

(71) Applicant: Xerox Corporation, Norwalk, CT (US)

(72) Inventors: Yujie Zhu, Mississauga (CA); Tianxiao Xu, Oakville (CA); Ethan Shen, Toronto (CA)

(73) Assignee: Xerox Corporation, Norwalk, CT (US)

( * ) Notice: Subject to any disclaimer, the term of this patent is extended or adjusted under 35 U.S.C. 154(b) by 936 days.

(21) Appl. No.: 16/943,380

(22) Filed: Jul. 30, 2020

(65) Prior Publication Data
US 2022/0034730 A1 Feb. 3, 2022

(51) Int. Cl.
G01L 1/20 (2006.01)
G01L 1/18 (2006.01)
G06F 3/041 (2006.01)

(52) U.S. Cl.
CPC ............. *G01L 1/205* (2013.01); *G01L 1/18* (2013.01); *G06F 3/04144* (2019.05)

(58) Field of Classification Search
None
See application file for complete search history.

(56) References Cited

U.S. PATENT DOCUMENTS

| 3,584,162 | A | 6/1971 | Krakinowski |
| 4,017,697 | A | 4/1977 | Larson |
| 4,362,911 | A | 12/1982 | Sears et al. |
| 4,508,942 | A | 4/1985 | Inaba |
| 4,677,417 | A | 6/1987 | Amagishi |
| 4,866,412 | A | 9/1989 | Rzepczynski |
| 4,935,841 | A | 6/1990 | Jonsson et al. |
| 5,198,629 | A | 3/1993 | Hayashi et al. |
| 5,828,289 | A | 10/1998 | Burgess |
| 6,360,612 | B1 * | 3/2002 | Trantzas ................. G01L 1/20 73/753 |
| 6,774,331 | B1 | 8/2004 | Den Ridder et al. |
| 7,726,207 | B2 | 6/2010 | Orlewski et al. |

(Continued)

FOREIGN PATENT DOCUMENTS

EP 2820518 1/2015

OTHER PUBLICATIONS

U.S. Appl. No. 16/929,531, filed Jul. 15, 2020, Systems and Methods for Improved Object Placement Sensing for Point of Purchase Sales.

(Continued)

*Primary Examiner* — Nasima Monsur
(74) *Attorney, Agent, or Firm* — Fox Rothschild LLP

(57) ABSTRACT

Systems and methods for detecting item placement on a surface are provided. The system includes a pressure-sensitive conductive sheet and a resistive grid connected to the pressure-sensitive conductive sheet. The resistive grid includes an electrically non-conductive polymer. The resistive grid includes one or more lines arranged in a pattern. The lines may include parallel lines, parallel and perpendicular lines, concentric circles, arcs of expanding radius, and/or any other suitable types of lines and/or any combination thereof. The resistive grid may include one or more distinct lines and/or shapes positioned at various points along the pressure-sensitive sheet layer.

16 Claims, 6 Drawing Sheets

(56) References Cited

U.S. PATENT DOCUMENTS

| | | |
|---|---|---|
| 9,030,289 B2 | 5/2015 | Lai |
| 9,671,297 B2 | 6/2017 | Sibbett |
| 9,761,790 B2 | 9/2017 | Yoo et al. |
| 9,831,051 B2 | 11/2017 | Maier |
| 10,121,121 B1 | 11/2018 | De Bonet et al. |
| 10,390,752 B2 | 8/2019 | Ashoori et al. |
| 10,442,091 B2 | 10/2019 | Kondoh et al. |
| 10,561,581 B2 | 2/2020 | Wong et al. |
| 10,628,725 B1 | 4/2020 | Mei et al. |
| 10,690,559 B1 | 6/2020 | Liu et al. |
| 10,859,458 B2 | 12/2020 | Asakura |
| 10,928,259 B2 | 2/2021 | Morita et al. |
| 11,367,581 B1 | 6/2022 | Santos et al. |
| 2002/0014968 A1 | 2/2002 | Fitzgerald et al. |
| 2003/0000821 A1 | 1/2003 | Takahashi et al. |
| 2005/0253723 A1 | 11/2005 | Shafer |
| 2010/0224474 A1 | 9/2010 | Jeffery |
| 2010/0242629 A1* | 9/2010 | Leuenberger .......... H01G 13/00 73/862.625 |
| 2011/0140853 A1 | 6/2011 | Jung et al. |
| 2012/0040610 A1 | 2/2012 | Moosavi et al. |
| 2012/0118066 A1 | 5/2012 | Majidi et al. |
| 2012/0123716 A1* | 5/2012 | Clark ...................... G01L 1/205 702/65 |
| 2012/0293450 A1* | 11/2012 | Dietz .................. G06F 3/04144 178/18.05 |
| 2013/0004750 A1* | 1/2013 | Majumdar ............ H10K 71/611 428/209 |
| 2014/0215928 A1 | 8/2014 | Desgorces et al. |
| 2014/0243709 A1 | 8/2014 | Gibson et al. |
| 2014/0253333 A1 | 9/2014 | Patterson et al. |
| 2015/0311012 A1 | 10/2015 | Wada et al. |
| 2016/0056444 A1 | 2/2016 | Hwang et al. |
| 2017/0065464 A1 | 3/2017 | Heil et al. |
| 2017/0089775 A1 | 3/2017 | Hsu et al. |
| 2017/0207729 A1 | 7/2017 | Kondoh et al. |
| 2017/0256155 A1 | 9/2017 | Sengstaken, Jr. |
| 2018/0093814 A1 | 4/2018 | Espinosa |
| 2018/0288889 A1 | 10/2018 | Fordham et al. |
| 2018/0319016 A1* | 11/2018 | Ibrocevic ................ G01L 1/205 |
| 2018/0320380 A1* | 11/2018 | Crowther ................ G01M 3/16 |
| 2019/0101462 A1 | 4/2019 | Kim |
| 2019/0103548 A1 | 4/2019 | Sugawara et al. |
| 2019/0151160 A1 | 5/2019 | Huq |
| 2019/0231083 A1 | 8/2019 | Hsu et al. |
| 2022/0020253 A1 | 1/2022 | Mei et al. |
| 2022/0125335 A1 | 4/2022 | Rofe et al. |

OTHER PUBLICATIONS

U.S. Appl. No. 17/228,991, filed Apr. 13, 2021, Membrane Switches Configured to Sense Pressure Applied From Compliant and Rigid Objects.

U.S. Appl. No. 17/228,998, filed Apr. 13, 2021, Membrane Switches Configured to Sense Pressure Applied From Compliant and Rigid Objects.

Pressure-Sensitive Conductive Sheet (Velostat/Linqustat), https://www.adafruit.com/product/1361, Nov. 8, 2019.

* cited by examiner

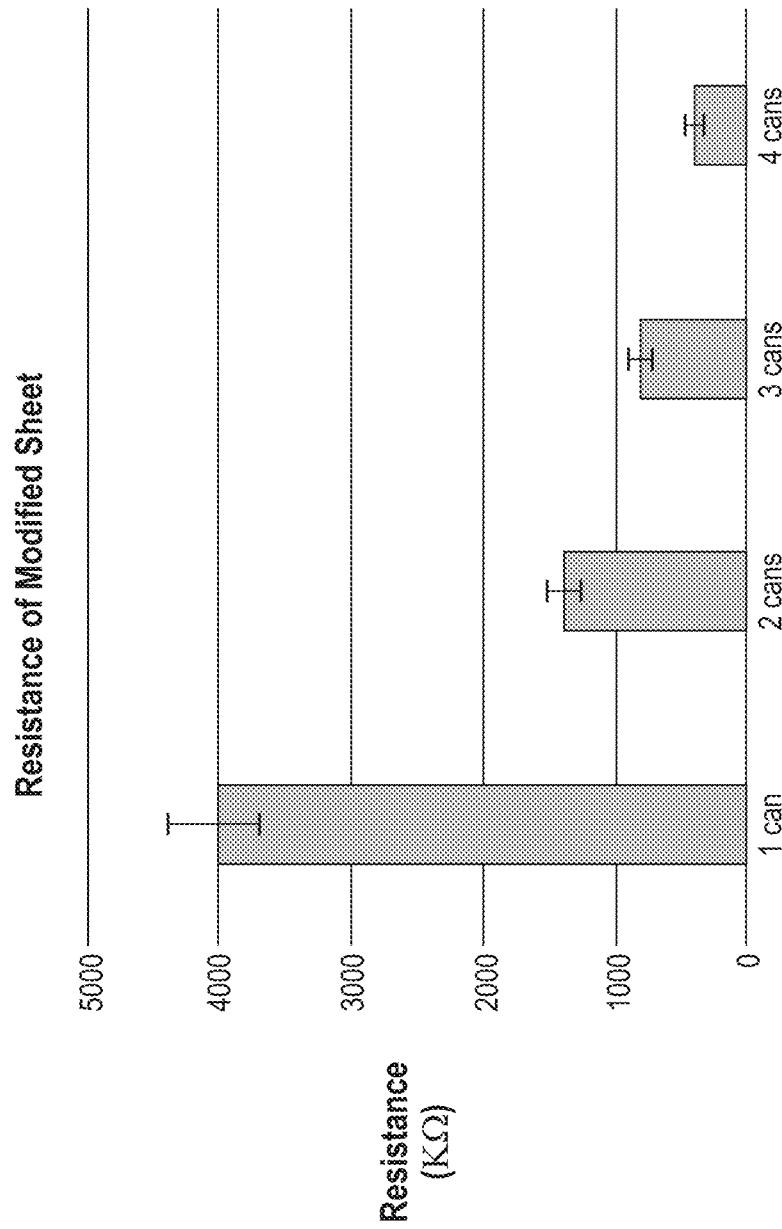

SYSTEMS AND METHODS FOR IMPROVED SENSING PERFORMANCE OF PRESSURE-SENSITIVE CONDUCTIVE SHEETS

BACKGROUND

The present disclosure relates to pressure-sensitive conductive sheets and, in particular, to surface modification of pressure-sensitive conductive sheets to improve sensing performance and analysis.

Pressure-sensitive conductive sheets are materials in which the electrical resistance is altered with the application of pressure against the materials. Generally, pressure-sensitive conductive sheets include a polymeric foil impregnated with carbon black, which makes the sheets electrically conductive. Examples of pressure-sensitive conductive sheets include "VELOSTAT®" and "LINQSTAT™." Squeezing or pressing against the pressure-sensitive conductive sheets lowers the electrical resistance of the sheets. This has resulted in this material being used in the manufacture of inexpensive sensors for microcontroller experiments.

One common application of pressure-sensitive conductive sheets is their use as weight sensors, such as weight sensors in smart Point-of-Purchase (PoP) display shelf liners, to detect the presence of products for purchase on the display shelf. However, standard commercial pressure-sensitive conductive sheets have limitations in detecting multiple heavy items due to the narrow weight detection range of the pressure-sensitive conductive sheets. This limits the usage of these standard sheets and their ability to convey information pertaining to the items positioned on the display shelf. For example, a typical pressure-sensitive conductive sheet may be able to detect up to three 360 g object such as cans on it, but the addition of a fourth 360 g object cannot trigger significant resistance change to set a threshold value.

Since multiple items are typically positioned on a PoP display shelf, it is beneficial for the pressure-sensitive conductive sheet to be able to determine the quantity of items on the display shelf and potentially the location of the items on the display shelf, enabling store owners to more efficiently display and keep track of product. However, since an object placed on a standard pressure-sensitive conductive sheet generates the same electrical signal regardless of the location of the object on the sheet during pickup or placement, commercial pressure-sensitive conductive sheets are not equipped to perform this function.

For at least these reasons, a modified pressure-sensitive conductive sheet capable of object position detection and a wider weight range is needed.

SUMMARY

According to an aspect of the present disclosure, a system for detecting item placement on a surface is provided. The system includes a pressure-sensitive conductive sheet that includes a resistive grid that is formed of an electrically non-conductive polymer.

According to various embodiments of the present disclosure, the pressure-sensitive conductive sheet includes a top conductive layer, a bottom conductive layer, and an electrically conductive pressure-sensitive sheet layer interposed between the top conductive layer and the bottom conductive layer.

According to various embodiments of the present disclosure, the electrically non-conductive polymer is embedded into the pressure-sensitive sheet layer.

According to various embodiments of the present disclosure, the pressure-sensitive sheet layer exhibits a decrease in electrical resistance with the application of pressure.

According to various embodiments of the present disclosure, the resistive grid includes a plurality of parallel lines extending along a surface of the pressure-sensitive sheet layer, forming a resistive grid pattern.

According to various embodiments of the present disclosure, the resistive grid includes a plurality of perpendicular lines, forming a resistive grid pattern.

According to various embodiments of the present disclosure, the resistive grid includes a plurality of resistive grid patterns, each of the plurality of resistive grid patterns having a unique resistive grid density.

According to various embodiments of the present disclosure, the electrically non-conductive polymer includes print toner.

According to various embodiments of the present disclosure, the pressure-sensitive sheet layer comprises one or more of the following: carbon black; and graphite.

According to various embodiments of the present disclosure, the top conductive layer or the bottom conductive layer include one or more polyolefins.

According to various embodiments of the present disclosure, the resistive grid is configured to increase a baseline resistance of the pressure-sensitive conductive sheet in response to application of pressure against the pressure-sensitive conductive sheet.

According to various embodiments of the present disclosure, the system further includes a sensor, coupled to the pressure-sensitive conductive sheet, configured to measure an electrical resistance of the pressure-sensitive conductive sheet.

According to various embodiments of the present disclosure, the sensor comprises one or more of the following: a multimeter; or an ohmmeter.

According to another aspect of the present disclosure, a method for detecting item placement on a surface is provided. The method includes placing an object onto a pressure-sensitive conductive sheet. The pressure-sensitive conductive sheet includes a top conductive layer, a bottom conductive layer, and an electrically conductive pressure-sensitive sheet layer interposed between the top conductive layer and the bottom conductive layer. The pressure-sensitive sheet layer an electrically non-conductive polymer forming a resistive grid, and placing the object onto the pressure-sensitive conductive sheet applies pressure against the pressure-sensitive conductive sheet. The method further includes measuring, using a sensor, a change in resistance of the pressure-sensitive conductive sheet, and, based on the change in resistance, determining that an object has been placed onto the pressure-sensitive conductive sheet.

According to various embodiments of the present disclosure, the method further includes, based on the change in resistance, determining a position on the pressure-sensitive conductive sheet on which the object has been placed.

According to various embodiments of the present disclosure, the pressure-sensitive sheet layer exhibits a decrease in electrical resistance with the application of pressure.

According to various embodiments of the present disclosure, the electrically non-conductive polymer includes print toner.

According to various embodiments of the present disclosure, the pressure-sensitive sheet layer comprises one or more of the following: carbon black; or graphite.

According to various embodiments of the present disclosure, the resistive grid is configured to increase a baseline resistance of the pressure-sensitive conductive sheet in response to application of pressure against the pressure-sensitive conductive sheet.

According to various embodiments of the present disclosure, the sensor comprises one or more of the following: a multimeter; or an ohmmeter.

BRIEF DESCRIPTION OF THE DRAWINGS

FIG. 3B is a graphical representation of the resistance measured with the application of weight against a PSCS modified with a printed resistive grid fused or otherwise connected to a pressure-sensitive sheet layer, in accordance with various embodiments of the present disclosure.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. When used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "top" and "bottom" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Other terms that are relevant to this disclosure are defined at the end of this Detailed Description section.

Figure 1:
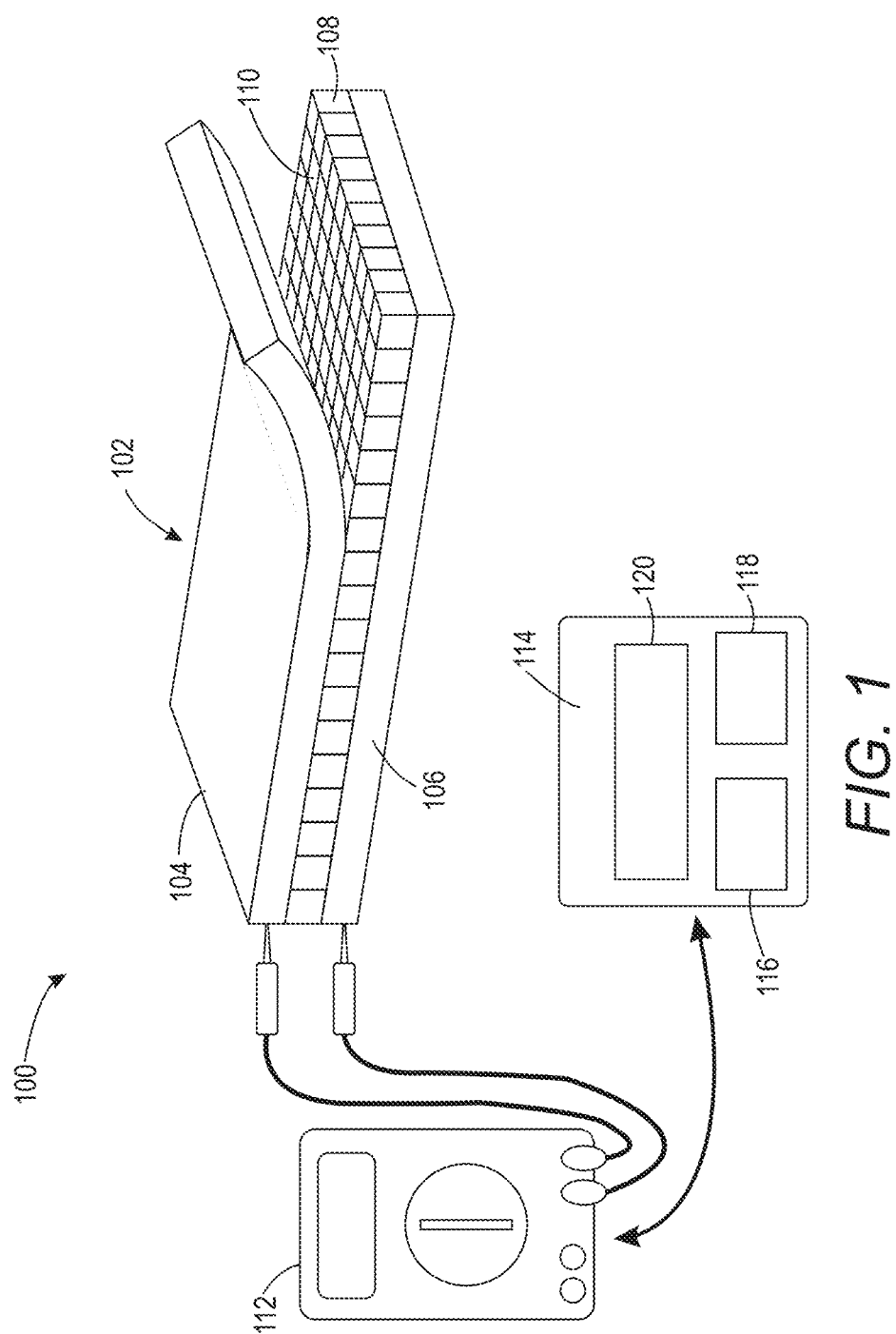
FIG. 1 is an example of a system for detecting one or more objects placed onto a pressure-sensitive conductive sheet ("PSCS"), in accordance with various embodiments of the present disclosure.

Referring now to FIG. 1, a system 100 for detecting one or more objects placed onto a pressure-sensitive conductive sheet ("PSCS") 102 is provided.

According to various embodiments, the system 100 includes a PSCS 102. The PSCS 102 as described in the present disclosure is a modification upon known commercial PSCSs that provides improved performance. The PSCS 102 forms a piezoresistive system which includes a top conductive layer 104 and a bottom conductive layer 106. The top layer 104 and/or the bottom layer 106 may include one or more conductive traces printed directly onto the PSCS 102, one or more polyolefins such as polyethylene or polypropylene, and/or any other suitable conductive sheets such as, for example, aluminum-coated biaxially-oriented polyethylene terephthalate ("BoPET").

According to various embodiments, interposed between the top layer 104 and the bottom layer 106 is a pressure-sensitive sheet layer 108. The pressure-sensitive sheet layer 108 includes an electrically conductive material such as, for example, carbon black, acetylene black, channel black, and graphite. It is noted, however, that the pressure-sensitive sheet layer 108 may include any suitable conductive material which, when interposed between the top layer 104 and the bottom layer 106, and when pressure is applied to the PSCS 102, causes a change in the resistance of the PSCS 102.

According to various embodiments, the pressure-sensitive sheet layer 108 includes a resistive grid 110 affixed thereon and/or embedded within. A "resistive grid" 110 refers to a polymer fused or otherwise connected to the pressure-sensitive layer 108, including one or more lines arranged in a pattern. The lines may include parallel lines, parallel and perpendicular lines, concentric circles, arcs of expanding radius, and/or any other suitable types of lines and/or any combination thereof. The resistive grid 110 may include one or more distinct lines and/or shapes positioned at various points along the pressure-sensitive sheet layer 108. According to various embodiments, the resistive grid 110 is printed onto the pressure-sensitive sheet layer 108 using, for example, a laser printer. However, other means of printing and/or otherwise affixing the resistive grid 110 onto the pressure-sensitive sheet layer may be used, while maintaining the spirit of the present disclosure and the functionality of the PSCS 102. According to various embodiments, the resistive grid 110 is applied to one or more surfaces of the pressure-sensitive sheet layer 108 at a sufficient temperature to enable the resistive grid 110 to become embedded into the pressure-sensitive sheet layer 108. By affixing one or more resistive grids 110 onto the PSCS 102, the electrical properties of the PSCS 102 are altered. For example, with the application of the resistive grid 110, the PSCSs 102 detection range is expanded to accommodate a larger number of objects and/or heavier objects when used as a weight sensor in a smart shelf liner: a shelf liner including one or more sensors and configured to automatically determine the presence, placement, and/or removal of one or more objects from the shelf liner. Moreover, the resistance response to a certain object can be adjusted with the density of the affixed resistive grids 110, which aids in the location monitoring of objects.

According to various embodiments, the resistive grid 110 may include one or more of, or any mixture of, vertical, horizontal, and/or curved lines forming any suitable shape or pattern. For example, four resistive grid designs are shown in FIGS. 2A-2D. These patterns are not all-inclusive and other resistive grid patterns, including, but not limited to, resistive grid patterns including straight lines, curved lines, and/or any combinations thereof, may be incorporated for use with the PSCS 102, while maintaining the spirit of the present disclosure.

According to various embodiments, the resistive grid pattern of the resistive grid 110 is designed using a graphical user interface coupled to a computer running computer software. According to various embodiments, the computer sends a print signal to a printer and the resistive grid 110 is printed onto the pressure-sensitive sheet layer 108. A fusing temperature, at which the resistive grid 110 is fused or otherwise connected to the pressure-sensitive sheet layer 108, may differ depending upon the material used as the pressure-sensitive sheet layer 108 and/or the material used to form the resistive grid 110. According to various embodiments, due to changes in the required fusing temperature, the fusing temperature of the printer used to print the resistive grid 110 may be set, manually or automatically, to a desired temperature prior to the printing of the resistive grid 110. According to various embodiments, the resistive grid pattern is applied to the pressure-sensitive sheet layer using a laser printer, and the fusing temperature may be set by adjusting the heat generated by the fuser component of the laser printer.

According to various embodiments, the resistive grid 110 is formed using an electrically non-conductive polymer such as powdered pigmented polymers (for example, print toner and, in particular, black print toner). According to various embodiments, the print toner may include one or more types of granulated plastics (for example, polypropylene, silica, etc.), carbon (for example, graphite, carbon black, etc.), and/or iron oxide. It is noted that any suitable polymers configured to be applied to the pressure-sensitive sheet layer 108 may be used. Furthermore, it is noted that other resistive grid materials may additionally, or alternatively, be used in the formation of the resistive grid 110.

Figure 2D:
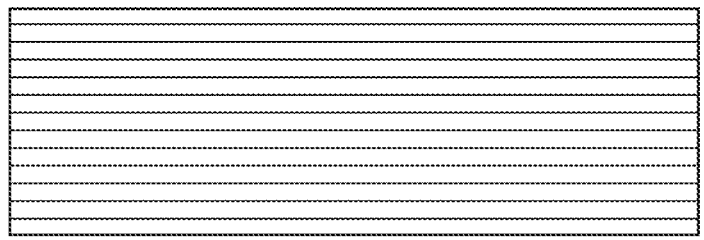
FIGS. 2A-2D are examples of resistive grid patterns which may be fused or otherwise connected to one or more pressure-sensitive sheet layers, in accordance with various embodiments of the present disclosure.
Figure 2C:
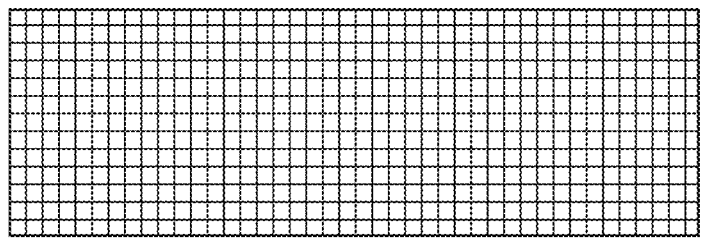
Figure 2B:
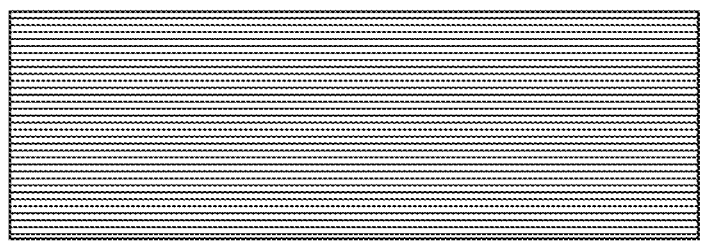
Figure 2A:
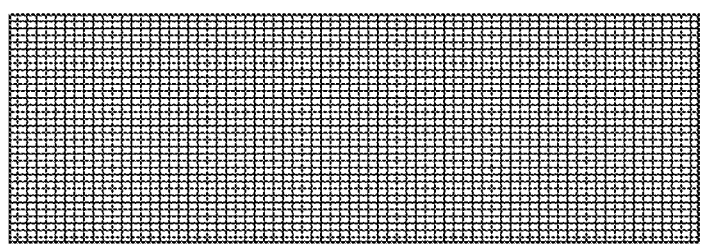

The density of the lines on the resistive grid 110 effect the properties of the pressure-sensitive sheet layer. FIG. 2 shows resistive grid patterns of various density, including, for example, a 2 mm×2 mm resistive grid pattern (FIG. 2A), a 2 mm parallel line resistive grid pattern (FIG. 2B), a 5 mm×5 mm resistive grid pattern (FIG. 2C), and a 5 mm parallel line resistive grid pattern (FIG. 2D). Other density resistive grids may also, or alternatively, be fused or otherwise connected to the pressure-sensitive sheet layer 108.

According to various embodiments, the system 100 further includes a sensor 112 for detecting an electrical resistance of the PSCS 102. The sensor 112 may be, for example, a multimeter, an ohmmeter, and/or any other suitable device for detecting the resistance of the PSCS 102. According to various embodiments, the sensor 112 may be coupled to and/or in electronic communication with, via wired and/or wireless connection, one or more electronic computing devices 114 such as, for example, a desktop computer, a laptop computer, a tablet computer, an onsite and/or remote server, and/or any other suitable computing device. The computing device or devices 114 may include, for example, a processor 116, a memory 118, a graphical user interface 120, and/or any other suitable components. According to various embodiments, the computing device 114 is configured to receive resistance measurements from the sensor 112 and store and execute software configured to enable the computing device 114 to analyze the measurements and, based on this analysis, determine whether an object has been placed onto the PSCS 102, whether an object has been removed from atop the PSCS 102, and/or where on the PSCS 102 an object has been placed and/or removed.

In an example, performance tests were conducted to determine the effect of resistive grid density on the electrical properties of the PSCS 102. These performance tests were carried out by measuring the resistance change of the PSCSs 102 with various resistive grids 110 having various resistive grid densities when weight or pressure was applied to the PSCSs 102. During these performance tests, the top layer 104 and the bottom layer 106 included aluminum-coated BoPET composite materials and sandwiched a central pressure-sensitive sheet layer 108. It is noted, however, that other suitable conductive materials may, in addition to, or alternatively, be used in the formation of the top layer 104 and the bottom layer 106. The resistance for each of the PSCSs 102 used during the performance tests was tested using a multimeter 112.

During the performance tests, the performance of the PSCSs 102, modified with the resistive grid 110 fused or otherwise connected to the pressure-sensitive sheet layer 108, were compared with unmodified PSCSs which lacked the resistive grid 110. The performance tests indicated that the PSCSs 102 with the fused or otherwise connected resistive grids 110 exhibited a larger detection range than the unmodified PSCSs lacking the resistive grid 110.

Figure 3A:
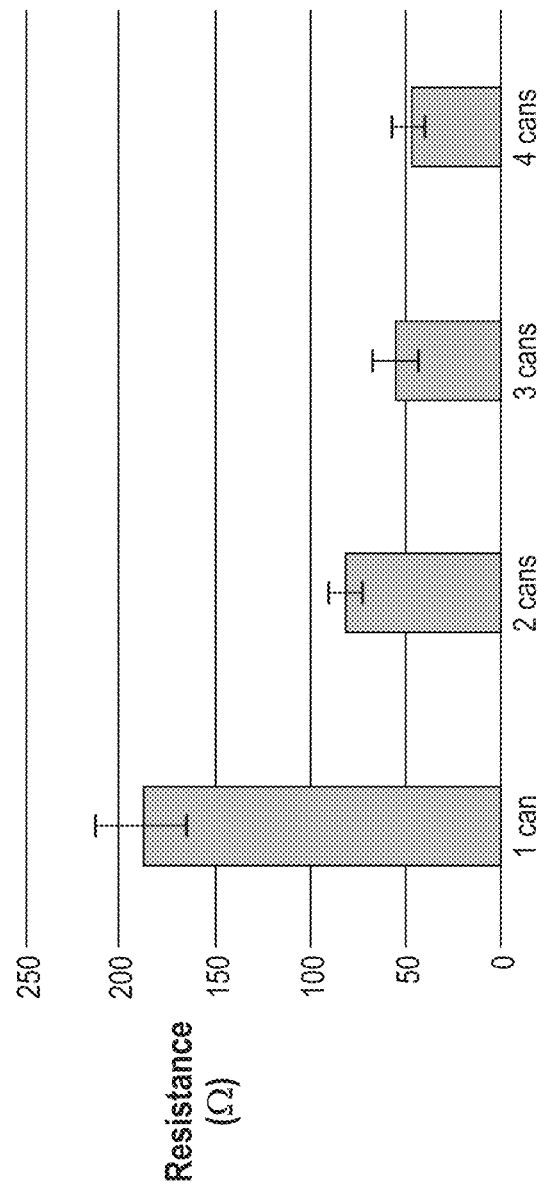
FIG. 3A is a graphical representation of the resistance measured with the application of weight against an unmodified PSCS, in accordance with various embodiments of the present disclosure.

FIGS. 3A and 3B illustrate the resistance response of the unmodified PSCSs (FIG. 3A) and the modified PSCSs 102 (FIG. 3B) with the application of 1 to 4 beverage cans placed upon the surface of the PSCSs under approximately the same conditions. The measured resistance illustrates, for both the modified and unmodified PSCSs, a decreasing trend as the number of cans increased (with an average mass of 360 g per can of beverage). With the addition of weight, the resistance decreases, as the particles of the pressure-sensitive sheet layer 108 are squeezed closer to each other, and better conductivity is achieved.

As indicated over multiple readings, the unmodified PSCS became saturated after three cans were placed and could not generate a significant resistance change when the fourth can was placed (as shown by the change in resistance in FIG. 3A). In contrast to the unmodified PSCS, the resistance measured with the modified PSCS 102, having the resistive grid 110 affixed upon the pressure-sensitive sheet layer 108, resulted, after multiple readings, in a smaller standard of deviation than that of the unmodified PSCS (as indicated in FIG. 3B), indicating that the change in resistance for the modified PSCS 102 is more consistent than that of the unmodified PSCS. Therefore, the detection range of the modified PSCS 102 is improved relative to the unmodified PSCS.

In addition to the increase in consistency, the application of the resistive grid 110 upon the pressure-sensitive sheet layer 108 altered the resistance readings of the modified PSCSs 102. For example, the higher the resistive grid density of the printed resistive grid 110, the higher the resistance reading when a weight was applied to the PSCS 102.

The effect of the resistance with regards to resistive grid density was tested using a series of resistive grid density tests for a plurality of resistive grid densities. During these resistive grid density tests, the resistance was measured for a PSCS 102 having a plurality of resistive grid patterns, each resistive grid pattern having a different resistive grid density resistive grid 110 fused or otherwise connected to the pressure-sensitive sheet layer 108. The same bottle or can was placed onto each of the resistive grid patterns of the PSCS 102, wherein each of the resistive grid patterns had a different and/or unique resistive grid density, and the resistance was measured for each of the resistive grid densities. As a control, the same bottle or can was placed onto an unmodified PSCS and the resistance was measured. The control experiment with the unmodified pressure-sensitive sheets confirmed that the resistance reading is within in a narrow range on four different areas: 142.8Ω, 149.4Ω, 133.8Ω, and 140.2Ω, respectively. The modified PSCS 102, having a resistive grid pattern having a plurality of resistive grid densities, generated significantly different resistance readings on the plurality of different resistive grid patterns. The resistance from the densest to the sparsest printed resistive grids decreased from 3.8 MΩ, 1.5 MΩ, 443 kΩ, and eventually to 236 kΩ. On the areas of the pressure-sensitive conductive sheet 108 with higher resistive grid densities, the resistive grid 110 covers a larger surface area, rendering it less conductive than the other areas of the pressure-sensitive sheet layer 108 having less dense resistive grid densities thus increasing the average resistance of the entire modified area of the PSCS 102.

Using this resistive grid patterning strategy, the electrical property of the PSCS 102 can be adjusted to a desired range by altering the resistive grid density of the resistive grid 110 fused or otherwise connected to the pressure-sensitive sheet layer 108. The variation in signals triggered on different modified areas of the PSCS 102 allows for more accurate location tracking of an object on a smart shelf liner that incorporates the system 100 and, in particular, the PSCS 102. The use of various resistive grid patterns incorporating one or more resistive grid densities on one or more areas of the pressure-sensitive sheet layer 102 enables the system 100 to more accurately determine not only the position of a product placed atop the PSCS 102, but also enables the system 100 to more accurately determine the number of objects placed atop the PSCS 102. The various resistive grid patterns may include, for example, checkerboard or cross patterns, herringbone patterns, chevron patterns, spiral patterns, circular patterns, and/or any other suitable patterns and/or any combinations thereof.

The ability to control the electrical properties of the PSCS 102 by printing and fusing graphic resistive grids 110, having one or more resistive grid patterns and/or one or more resistive grid densities, onto the pressure-sensitive sheet layer 108 improves upon the existing and traditional PSCSs and therefore makes the present PSCS 102 more suitable for smart shelf liner applications. This is due, at least in part, to benefits which include an expanded weight detection range to monitor more or heavier items, and an adjustable electrical response to the same object to realize location identification. Additionally, the resistive grid patterns of the PSCSs 102 can be configured with commonly used computer software, decreasing the cost of production of the resistive grids 110. For example, a user may use the graphical user interface 120 to draw and/or apply one or more shapes into a grid defining the dimensions (for example, size, width, height, etc.) of each portion of a resistive grid, forming a resistive grid pattern. The designed resistive grid pattern may then, according to some embodiments, be sent, as a print job, to a print device for applying the resistive grid pattern onto one or more pressure-sensitive conductive sheets 108. Furthermore, the flat and flexible form factor of the pressure-sensitive conductive sheets 108 is not significantly altered with the addition of the resistive grid 110 fused or otherwise connected to the sheet 108, thus providing a further benefit over traditional PSCSs.

Figure 4:
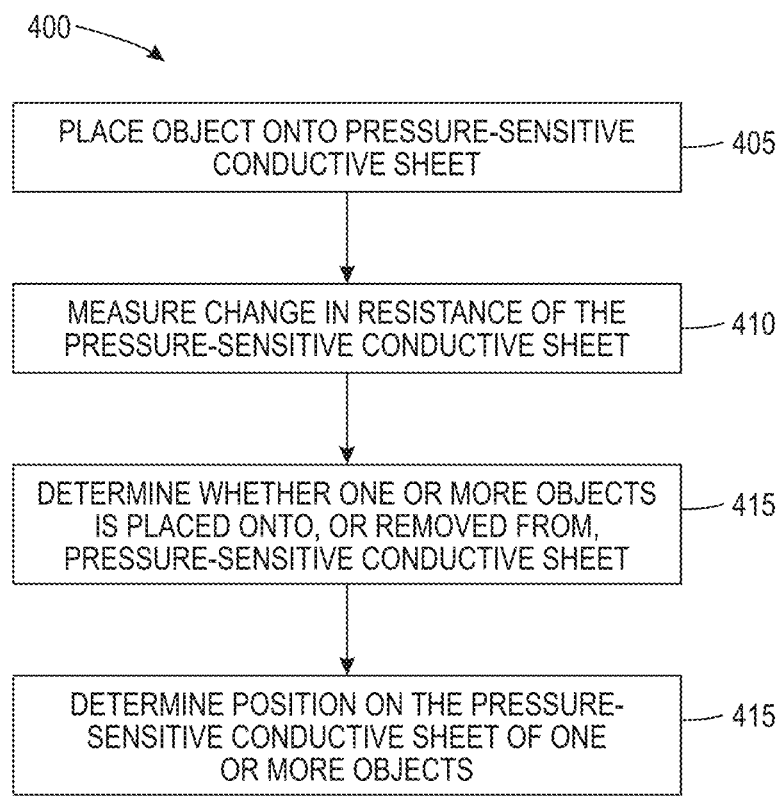
FIG. 4 is a flow diagram of a method for detecting one or more objects placed onto a PSCS, in accordance with various embodiments of the present disclosure.

Referring now to FIG. 4, a method 400 for detecting one or more objects placed onto a PSCS is illustratively depicted, in accordance with various embodiments of the present disclosure.

At 405, an object is placed onto a modified PSCS having a top conductive layer, a bottom conductive layer, and a pressure-sensitive sheet layer positioned between the top conductive layer and the bottom conductive layer. According to various embodiments, the pressure-sensitive sheet layer is modified to include a resistive grid pattern affixed thereto, forming an affixed resistive grid. The affixed resistive grid may include an electrostatic material such as, for example, printer toner. The affixed resistive grid alters the electrical properties of the PSCS over an unmodified PSCS. For example, the addition of the affixed resistive grid increases a baseline electrical resistance of the PSCS in response to the application of pressure against the PSCS, which occurs, for example, when an object is set on top of the PSCS. This increases the weight detection range of the modified PSCS over that of an unmodified PSCS, enabling changes in resistance when heavier objects are positioned on the modified PSCS to be detected by the modified PSCS.

The resistive grid density for a particular resistive grid affects the change in electrical resistance with the application of pressure. According to various embodiments, the modified PSCS includes a plurality of distinct resistive grids, each having a distinct resistance response when pressure is applied thereto, enabling the location of a particular item to be determined.

At 410, a sensor, such as, for example, a multimeter or ohmmeter, which is coupled to the modified PSCS, calculates a change in an electrical resistance after one or more objects are set onto the modified PSCS. According to various embodiments, a computing device, analyzing these one or more resistance calculations, determines, at 415, whether one or more objects has been placed onto, or removed from, the modified PSCS, and/or, at 420, determines a position of the one or more objects on the modified PSCS. According to various embodiments, determining whether an object has been placed onto, or removed from, the PSCS includes sensing an increase or decrease in the electrical resistance of the PSCS. According to various embodiments, software, run by one or more electronic computing devices in electronic communication with the one or more sensors, analyses the electrical resistance measured by the one or more sensors for the PSCS over a length of time. According to various embodiments, if a slope of an increase and/or decrease in resistance over time is greater than a threshold, than the increase and/or decrease in electrical resistance is marked as a step, indicating that an object has been placed on, or removed from, the PSCS.

Figure 5:
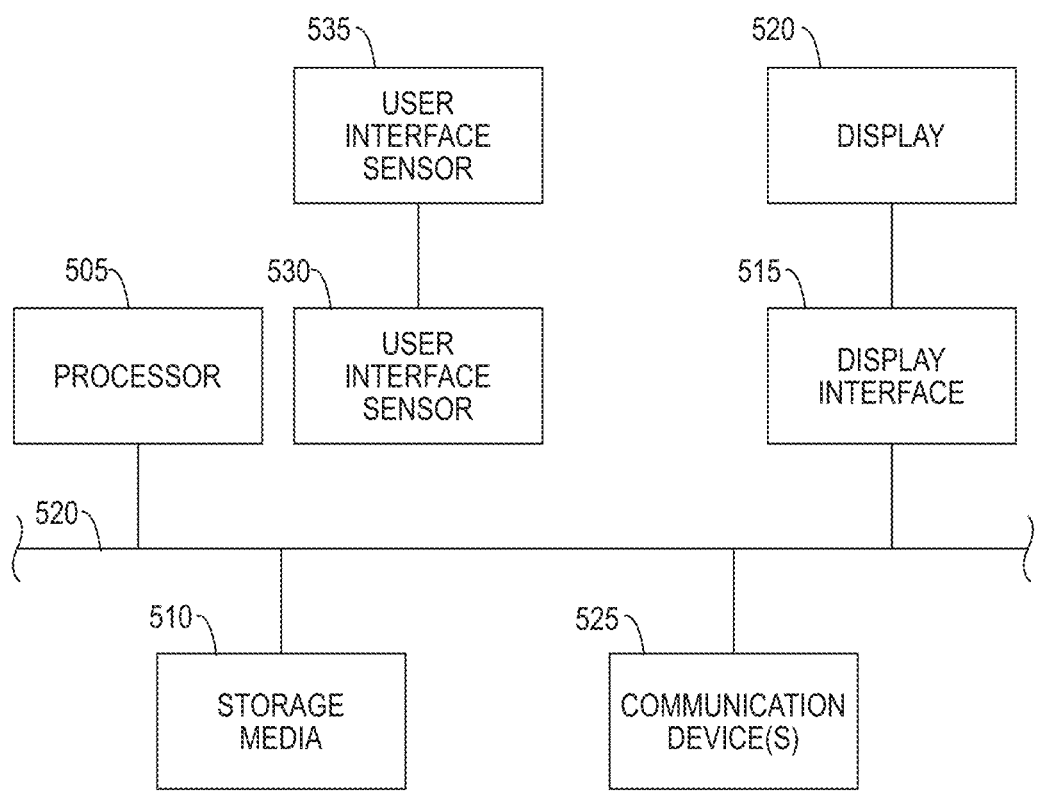
FIG. 5 illustrates a block diagram of example hardware that may be used to contain or implement program instructions according to various embodiments of the present disclosure.

FIG. 5 depicts an example of internal hardware that may be included in any of the electronic components of an electronic device as described in this disclosure such as, for example, an electronic computing device and/or any other integrated system and/or hardware that may be used to contain or implement program instructions.

A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an example of a processor as such term is used within this disclosure. Read only memory (ROM) and random access memory (RAM) constitute examples of non-transitory computer-readable storage media 510, memory devices or data stores as such terms are used within this disclosure.

Program instructions, software or interactive modules for providing the interface and performing any querying or analysis associated with one or more data sets may be stored in the computer-readable storage media 510. Optionally, the program instructions may be stored on a tangible, non-transitory computer-readable medium or portable memory device such as a compact disk, a digital disk, flash memory, a memory card, a USB drive, an optical disc storage medium and/or other recording medium.

An optional display interface 515 may permit information from the bus 500 to be displayed on the display 520 in audio, visual, graphic or alphanumeric format. Communication with external devices may occur using various communication ports 525. A communication port 525 may be attached to a communications network, such as the Internet or an intranet. In various embodiments, communication with external devices may occur via one or more short range communication protocols.

The hardware may also include an interface 530, such as graphical user interface, which allows for receipt of data from input devices such as a keyboard or other input device 535 such as a mouse, a joystick, a touch screen, a remote control, a pointing device, a video input device and/or an audio input device.

In this document, "electronic communication" refers to the transmission of data via one or more signals between two or more electronic devices, whether through a wired or wireless network, and whether directly or indirectly via one or more intermediary devices. Devices are "communicatively connected" if the devices are able to send and/or receive data via electronic communication.

A "computer," "computing device," or "electronic device" refers to a device that includes a processor and non-transitory, computer-readable memory. The memory may contain program instructions that, when executed by the processor, cause the computing device to perform one or more operations according to the program instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "print device" refers to a machine having hardware capable of receiving a digital document file and use the information from the file and associated print instructions to print a document represented in the file on a substrate and produce a physical document. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. A print device may have additional capabilities such as scanning or faxing and thus may be a multifunction device.

A "print job" refers to a set of instructions that causes a print device to print one or more document files. In this document, the set of instructions may be from a user to a print device, or it may be generated by a system or the print device after detecting a trigger event.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for detecting item placement on a surface, comprising:
 a top conductive layer;
 a bottom conductive layer;
 a pressure-sensitive conductive sheet interposed between the top conductive layer and the bottom conductive layer; and
 a resistive grid, printed onto and fused to the pressure-sensitive conductive sheet,
 wherein:
  the resistive grid comprises:
   a plurality of lines arranged in a pattern, and
   a plurality of resistive grid patterns,
  each line, of the plurality of lines, comprises an electrically non-conductive polymer,
  the pressure-sensitive conductive sheet exhibits a decrease in electrical resistance with the application of pressure,
  each of the plurality of resistive grid patterns comprises a unique resistive grid density configured to affect a change in the electrical resistance with the application of pressure,
  each resistive grid pattern, of the plurality of resistive grid patterns, forms a modified area of the system, and
  the unique resistive grid density of each of the plurality of resistive grid patterns are configured to cause variations in resistance in each modified area.

2. The system as recited in claim 1, wherein the plurality of lines are embedded into the pressure-sensitive conductive sheet.

3. The system as recited in claim 1, wherein the resistive grid includes a plurality of parallel lines extending along a surface of the pressure-sensitive sheet layer, forming a resistive grid pattern.

4. The system as recited in claim 1, wherein the resistive grid includes a plurality of perpendicular lines, forming a resistive grid pattern.

5. The system as recited in claim 1, wherein the electrically non-conductive polymer includes print toner.

6. The system as recited in claim 1, wherein the pressure-sensitive sheet layer comprises one or more of the following: carbon black; and graphite.

7. The system as recited in claim 1, wherein the top conductive layer or the bottom conductive layer include one or more polyolefins.

8. The system as recited in claim 1, wherein the resistive grid is configured to increase a baseline resistance of the pressure-sensitive conductive sheet in response to application of pressure against the pressure-sensitive conductive sheet.

9. The system as recited in claim 1, further comprising:
 a sensor, coupled to the pressure-sensitive conductive sheet, configured to measure an electrical resistance of the pressure-sensitive conductive sheet.

10. The system as recited in claim 8, wherein the sensor comprises one or more of the following: a multimeter; or an ohmmeter.

11. A method for detecting item placement on a surface, comprising:
 placing an object onto a system, wherein the system comprises:
  a top conductive layer;
  a bottom conductive layer;
  a pressure-sensitive conductive sheet interposed between the top conductive layer and the bottom conductive layer; and
  a resistive grid, printed onto and fused to the pressure-sensitive conductive sheet, wherein:
the resistive grid comprises:
a plurality of lines arranged in a pattern, and
a plurality of resistive grid patterns,
each line, of the plurality of lines, comprises an electrically non-conductive polymer,
placing the object onto the system applies pressure against the pressure-sensitive conductive sheet,
the pressure-sensitive conductive sheet exhibits a decrease in electrical resistance with the application of pressure, and
each of the plurality of resistive grid patterns comprises a unique resistive grid density configured to affect a change in the electrical resistance with the application of pressure;
measuring, using a sensor, a change in resistance of the system; and
based on the change in resistance, determining that an object has been placed onto the pressure-sensitive conductive sheet,
wherein:
each resistive grid pattern, of the plurality of resistive grid patterns, forms a modified area of the system; and the unique resistive grid density of each of the plurality of resistive grid patterns are configured to cause variations in resistance in each modified area.

12. The method as recited in claim 11, further comprising:
based on the change in resistance, determining a position on the pressure-sensitive conductive sheet on which the object has been placed.

13. The method as recited in claim 11, wherein the electrically non-conductive polymer includes print toner.

14. The method as recited in claim 11, wherein the pressure-sensitive sheet layer comprises one or more of the following: carbon black; or graphite.

15. The method as recited in claim 11, wherein the resistive grid is configured to increase a baseline resistance of the pressure-sensitive conductive sheet in response to application of pressure against the pressure-sensitive conductive sheet.

16. The method as recited in claim 11, wherein the sensor comprises one or more of the following: a multimeter; or an ohmmeter.

* * * * *